(12) United States Patent
Morley et al.

(10) Patent No.: US 6,795,869 B1
(45) Date of Patent: Sep. 21, 2004

(54) VIDEO SIGNAL PROCESSING METHOD AND APPARATUS FOR INTERNET APPLIANCES OR EMBEDDED SYSTEMS

(75) Inventors: Kenneth S. Morley, Draper, UT (US); Todor Cooklev, Moraga, CA (US); Mark Gray, West Jordan, UT (US); Darrin J. Gibbs, South Jordan, UT (US)

(73) Assignee: 3Com Corporation, Santa Clara, CA (US)

( * ) Notice: Subject to any disclaimer, the term of this patent is extended or adjusted under 35 U.S.C. 154(b) by 809 days.

(21) Appl. No.: 09/794,841

(22) Filed: Feb. 27, 2001

(51) Int. Cl.[7] .............................................. G06F 15/16
(52) U.S. Cl. ...................................... 709/246; 709/217
(58) Field of Search ................................ 709/246, 217, 709/218, 219, 213, 214, 215, 216, 208; 708/313; 710/52

(56) References Cited

U.S. PATENT DOCUMENTS

| | | | | |
|---|---|---|---|---|
| 4,441,200 A | * | 4/1984 | Fette et al. | 704/207 |
| 5,528,527 A | * | 6/1996 | Iwata et al. | 708/316 |
| 6,041,339 A | * | 3/2000 | Yu et al. | 708/313 |
| 6,150,862 A | * | 11/2000 | Vikinski | 327/262 |

OTHER PUBLICATIONS

Z. Tu et al, "Speech Recognition Over the Internet Using Java", IEEE International Conference on Acoustics, Speech and Signal Processing, Phoenix, Arizona, Mar. 1999, pp. 2367–2370.

M. Vetterli et al, Wavelets and Subband Coding, (© 1995 Prentice–Hall PTR), pp. 70–72.

* cited by examiner

Primary Examiner—Mehmet B. Geckil
(74) Attorney, Agent, or Firm—Michaelson & Associates; Peter L. Michaelson

(57) ABSTRACT

A communication system embodying the invention has a communication channel with at least two ends, one end of the channel being connected to a transmission device with relatively limited computational capacity and an other end of the channel being connected to a computer having relatively large computational capacity. The transmission device includes a signal source node; a set of M−1 delay buffers connected in series and defining a set of M progressively delayed signal nodes, M being a positive integer, one end of the series of M delay buffers being connected to the signal source node; a set of M parallel downsampling operators connected to the M progressively delayed signal nodes; and, a parallel-to-serial converter having M parallel inputs and a single serial output, the M parallel inputs being connected to the outputs of the M parallel downsampling operators and the single serial output being coupled to the one end of the communication channel. A set of M parallel filter coefficient multipliers having respective inputs and outputs and corresponding to the respective coefficients $H_i(z^{-1})$ of an anti-aliasing filter $H(z)=\Sigma_{i=0}^{M-1}z^{-i}H_i(z^{-M})$ is implemented in the computer to minimize the computational requirements for the transmission device to simple tasks.

22 Claims, 7 Drawing Sheets

VIDEO SIGNAL PROCESSING METHOD AND APPARATUS FOR INTERNET APPLIANCES OR EMBEDDED SYSTEMS

BACKGROUND OF THE INVENTION

1. Technical Field

The invention is related to video signal processing for simple dedicated devices such as internet appliances or dedicated devices implemented as simple embedded operating systems.

2. Background Art

Internet appliances are embedded electronic systems at the edge of the internet. The market for these devices is just emerging and is expected to grow at he huge growth rate of internet technology. Internet appliances are typically characterized by the following characteristics that render them inexpensive: (1) low-speed internet connection and (2) limited hardware resources and therefore limited computational resources. It is felt that in the near future various consumer electronic devices that are commonly found in the home will be networked together with internet appliances in a home network and/or via the internet. Such internet appliances will include video devices such as cameras or displays.

One problem is that video signal processing and transmission requires a very large bandwidth. For example, the raw rate of High Definition Television (HDTV) is about one giga-bit per second. This bandwidth will not be available to home internet connections at least in the near future, and even if it were to become available soon, the transmission of raw or uncompressed video signals is not an efficient use of a network link. Thus, it is necessary to compress the video signal prior to transmission on a network or on the internet. Unfortunately, video compression requires significant computational resources well beyond the capability of an internet appliance. In order to produce high-quality images, most systems require very large computational resources and communication bandwidth. However, internet appliances have limited computational resources in part due to their inexpensive structure and because, in many cases, they are battery-powered and therefore do not have sufficient electrical power to support an intense computational effort. In typical video compression, the encoder (within the transmitter) is necessarily more complex than the decoder (within the receiver). This fact further exacerbates the problem of limited computational resources in an internet appliance in those cases in which the internet appliance is the originator or transmitter of video signals.

One approach to obtaining signal processing capability for application to voice data is described by Z. Tu and P Loizou, "Speech recognition over the Internet using Java," IEEE ICASSP 1999, Phoenix, Ariz. In this paper, it is proposed that a user can employ an internet browser such as Netscape Communicator to perform speech recognition by visiting a web site on a server that hosts applications capable of performing such a task. This browser-enabled architecture requires the voice to be recorded and sent to the speech-recognition server for processing. The results are then sent back to the client computer via the internet. However, when considered by the inventors herein as a possible application for signal processing by internet devices, several problems arose that would prevent such an application. First, the use of a browser in this proposal imposes computational requirements well beyond the capability of a typical internet appliance. Secondly, the browser must be pointed to the URL of the server with the web site hosting the desired signal processing application. Thirdly, the promptness and quality of service depends entirely on the maintenance of the remote web site and therefore cannot be guaranteed. Fourth, all of the raw data and processing results must be transmitted via the internet, which conflicts with the need to only transmit video data that has been compressed first to stay within a reasonable bandwidth.

Therefore, there is a need to process a video signal from or to an internet appliance so as to avoid using excessive bandwidth but without requiring more than very minor computational resources within the internet appliance.

SUMMARY OF THE INVENTION

A communication system embodying the invention has a communication channel with at least two ends, one end of the channel being connected to a transmission device with relatively limited computational capacity and an other end of the channel being connected to a computer having relatively large computational capacity. The transmission device includes a signal source node; a set of M−1 delay buffers connected in series and defining a set of M progressively delayed signal nodes, M being a positive integer, one end of the series of M delay buffers being connected to the signal source node; a set of M parallel downsampling operators connected to the M progressively delayed signal nodes; and, a parallel-to-serial converter having M parallel inputs and a single serial output, the M parallel inputs being connected to the outputs of the M parallel downsampling operators and the single serial output being coupled to the one end of the communication channel.

The computer has communication architecture including a serial-to-parallel converter having a single serial input and M parallel outputs, the single serial input being coupled to the other end of the communication channel; a set of M parallel filter coefficient multipliers having respective inputs and outputs and corresponding to the respective coefficients $H_i(z^{-1})$ of an anti-aliasing filter $H(z)=\Sigma_{i=0}^{M-1} z^{-i} H_i(z^{-M})$, the inputs of the multipliers being connected to respective ones of the M parallel outputs of the serial-to-parallel converter; and, a set of M−1 adders connected in series to define a set of M inputs and a single output, the outputs of the M multipliers being connected to respective ones of the set of M inputs defined by the series of adders, the single output of the series of adders being a received signal output.

DETAILED DESCRIPTION OF THE PREFERRED EMBODIMENTS

Figure 1:
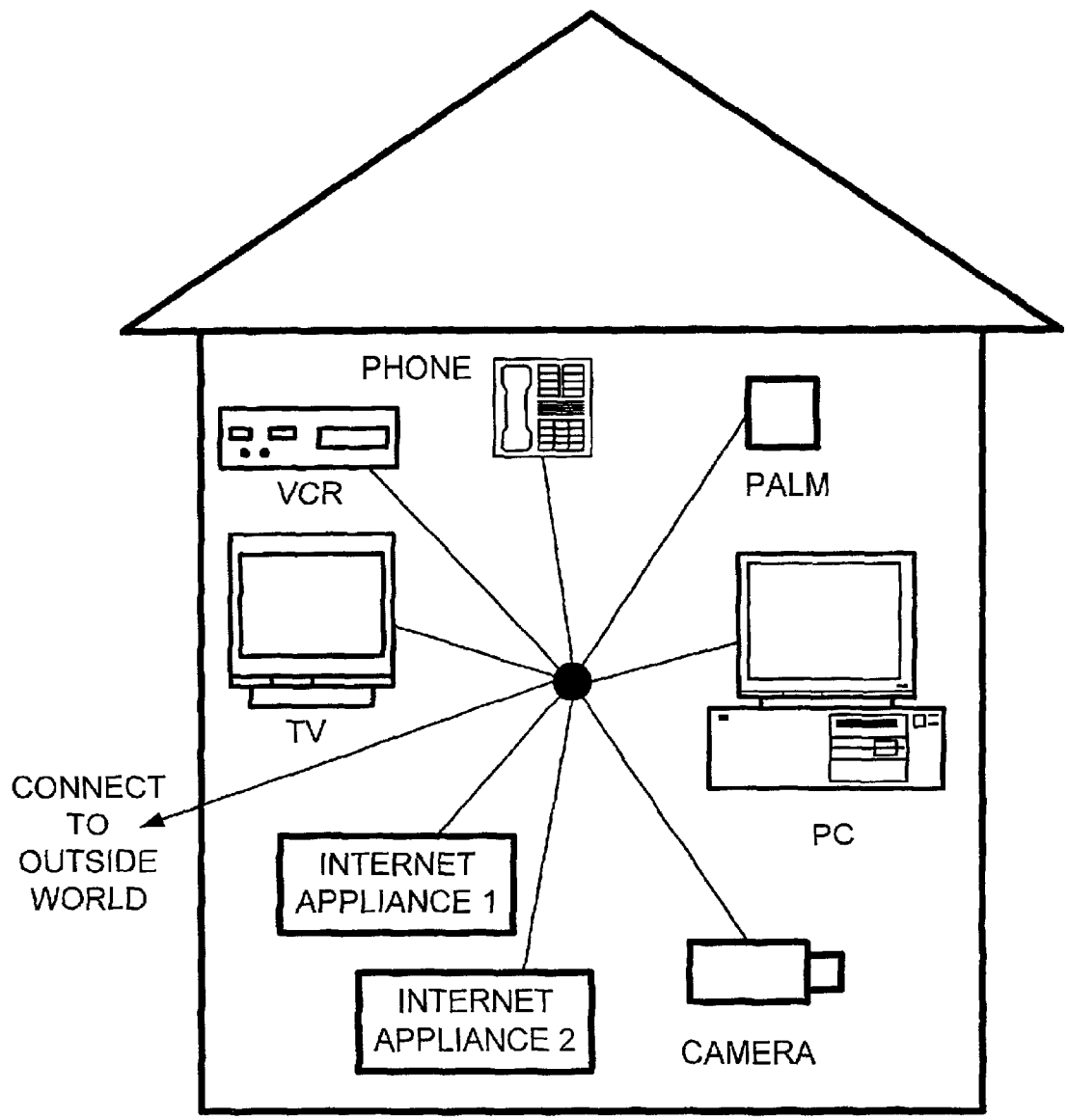
FIG. 1 is a simplified diagram illustrating the placement of internet appliances in a home network.

FIG. 1 illustrates one example of a home-based network or local area network of numerous consumer electronic devices including some internet appliances. One example of such an internet appliance could be a simple inexpensive device installed in every home in tornado plagued states that receives via the internet the latest Weather Service information on tornadoes in the local area and executes a dedicated application to construct an up-to-date graphical display with appropriate warnings. Another example could be a device that monitors removal use of food from a kitchen cupboard or refrigerator and automatically sends an order via the internet to a store for a delivery to replenish the depleted provisions. There are numerous other examples. For example, an internet appliance remote from the homeowner's host computer could provide video images via the internet for visually monitoring things about the house (e.g., the garden or lawn) that require maintenance. The gardener could access the internet to visually monitor the state of the lawn (e.g., via notebook computer and cellphone in his truck) in order to time his trip to the home to coincide with the first vestiges of overgrowth or unkempt appearance, or dehydration or arrival of apparent fungus or insect attacks on the lawn or plants.

The problem, as set further previously herein, is that a truly inexpensive remote internet appliance would not have the capability to perform the requisite video compression before transmitting video signals to either the homeowner's host computer via the in-home network or to a remote computer via the internet. The problem is how to perform compression or reduction in an embedded system with limited computational resources.

Figure 2A:
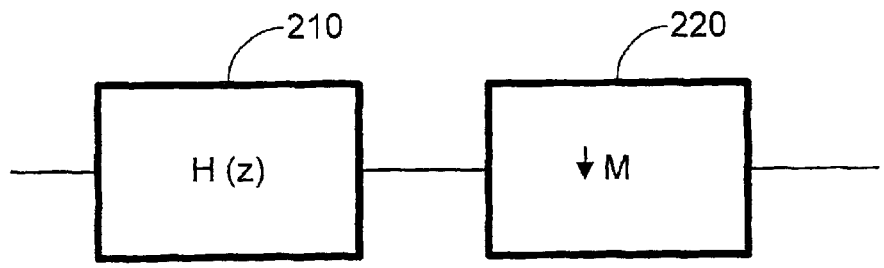
FIG. 2A is a diagram of a conventional signal processing filter employed in processing video signals.

Referring to FIG. 2A, video signal processing typically requires a filter 210 that implements a filtering function H(z) for anti-aliasing, for example, and a down sampler 220 that reduces the resulting data stream to reduce the required bandwidth. The down sampler 220 in effect reduces the image samples from an original number of samples M. The anti-aliasing filter H(z) is of the type well-known in the art and its transfer function is represented as:

$$H(z) = \Sigma_{i=0}^{M-1} z^{-i} H_i(z^{-M}) \quad (1)$$

The filter coefficient terms $H_i(z^{-1})$ are known as polyphase components. Various methods are well known in the prior art for the design of the filter H(z), and therefore for the polyphase components. Some of them are described, for example, in the book by M. Vetterli and J. Kovacevic "Wavelets and subband coding", Prentice-Hall, Englewood Cliffs, N.J., 1995.

Figure 2B:
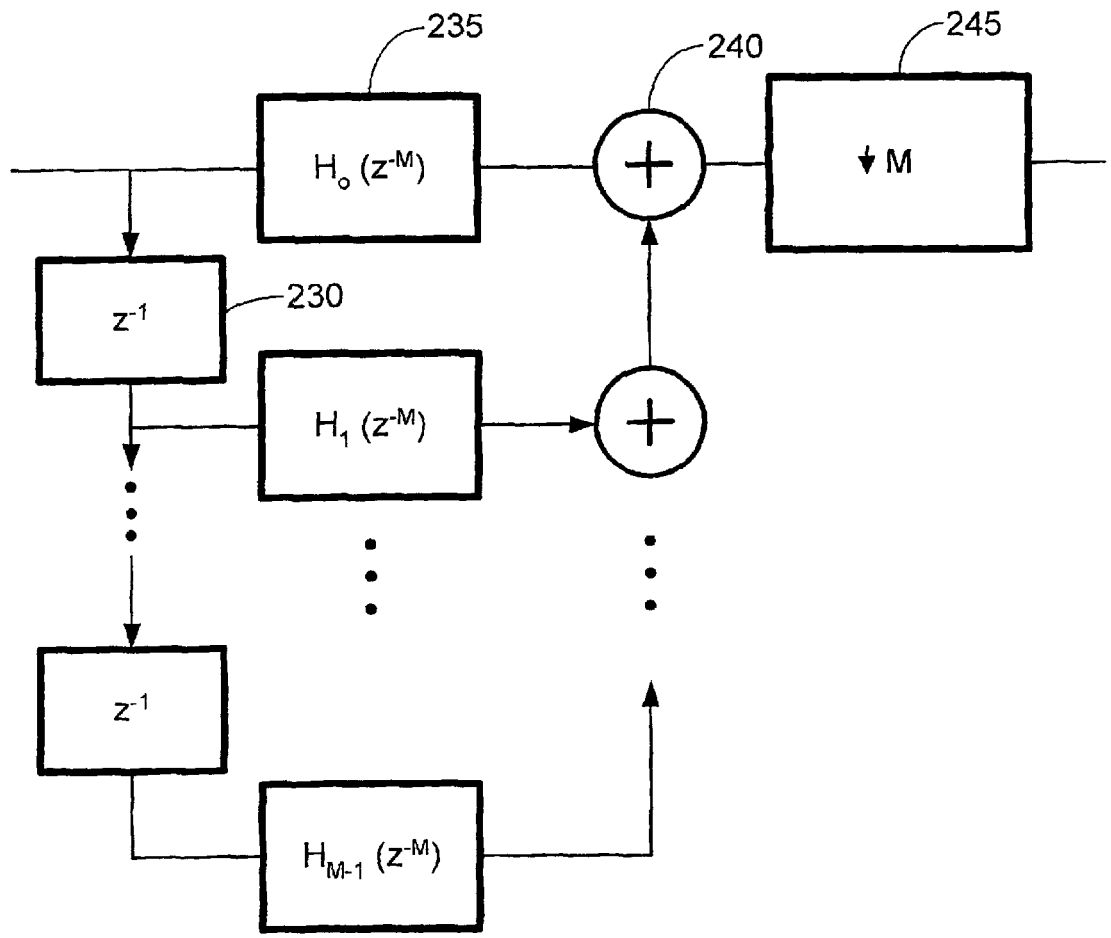
FIG. 2B illustrates the filter of FIG. 2A in greater detail.
Figure 2C:
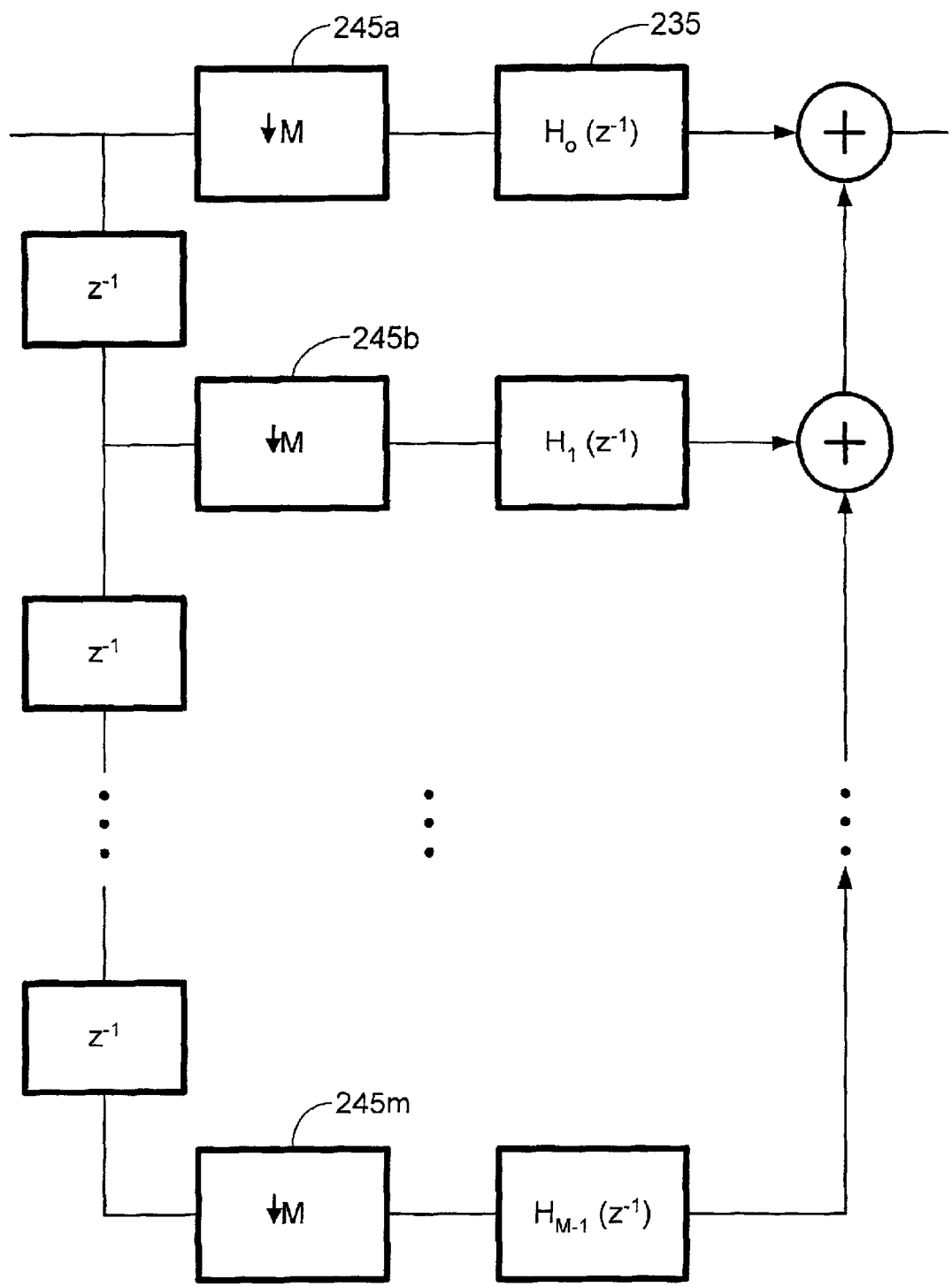
FIG. 2C illustrates a modification of the filter of FIG. 2B in which the order of certain operations has been reversed.

FIG. 2B illustrates the decomposition of the filter into M delay buffers 230, M filter coefficient multipliers 235 and M adders 240 that together implement Equation (1). The result is downsampled by a downsampling operator 245. This latter operation reduces the data in the video stream, in effect performing the desired "compression". FIG. 2C illustrates how, in accordance with the present invention, the downsampling operation of the operator 245 may be distributed among M operators 245a–245m and placed before the filter coefficient multipliers 235 (rather than after them as in FIG. 2B). Each of the distributed downsampling operators 245a–245m of FIG. 2C has the same downsampling ratio as the single downsampling operator 245 of FIG. 2B. Interestingly, the data rate in the M distributed downsampling operators 245a–245m of FIG. 2C is 1/M that of the data rate in the single downsampling operator 245 of FIG. 2B. The apparatus of FIG. 2C implements Equation (1) despite its differences with that of FIG. 2B.

Figure 3:
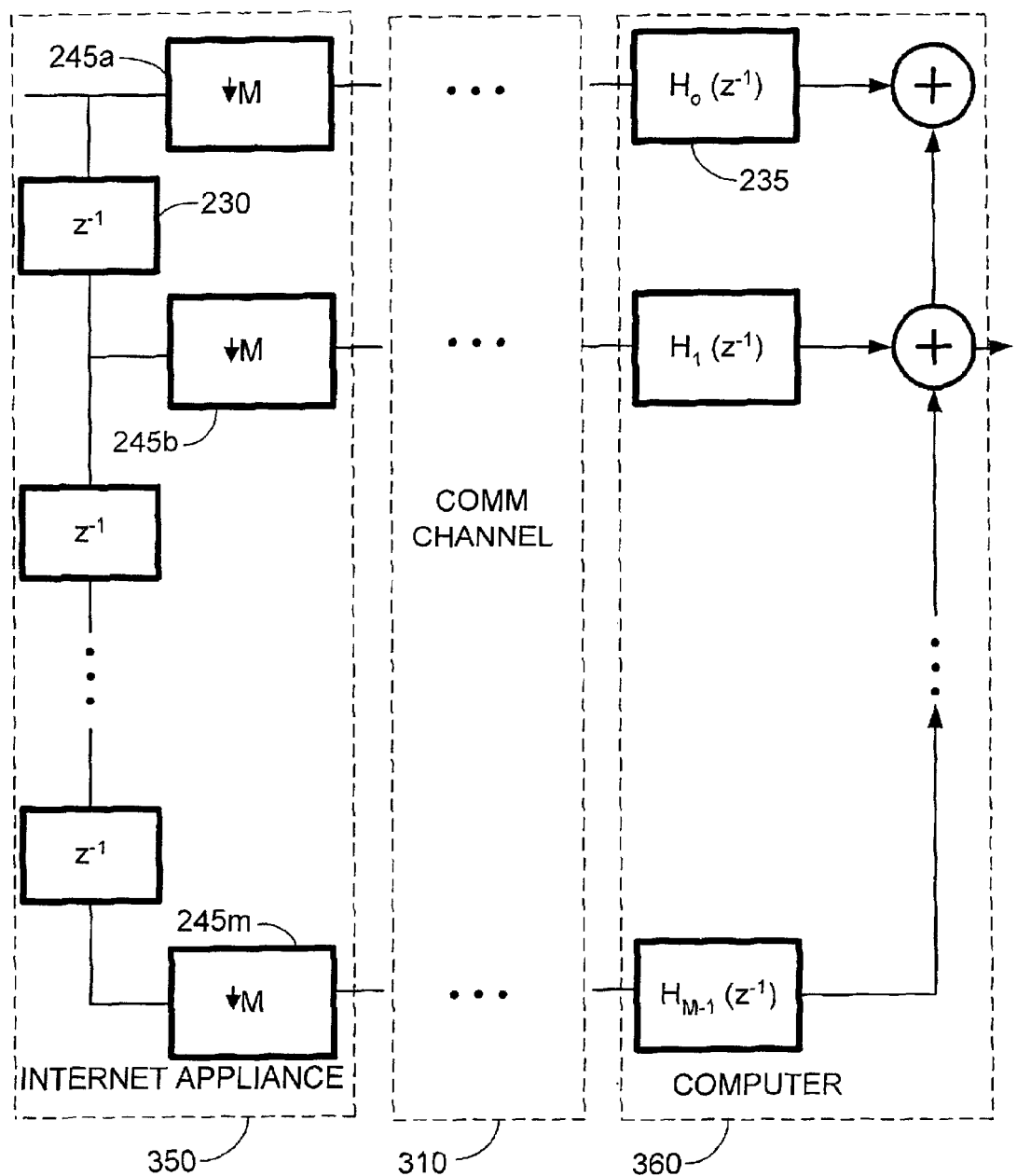
FIG. 3 illustrates a signal processing filter for processing video signals distributed between an internet appliance and a remote host computer in accordance with the present invention.

FIG. 3 illustrates how, in accordance with the present invention, a communication channel 310 is interposed between the downsampling operators 245a–245m and the filter coefficient multipliers 235. In FIG. 3, the "compressed" data output from the M downsampling operators 245a–245m is transmitted on the communication channel 310 with a reasonable bandwidth due to the data reduction performed by the downsampling operators 245a–245m. Preferably, rather than transmitting M data streams in parallel, the outputs of the M downsampling operators 245a–245m are interleaved into a single serial stream for transmission on the communication channel 310 and the serial stream de-interleaved at the other end of the communication channel 310 to provide M data streams for input to the M filter coefficient multipliers 235.

A principal advantage of the apparatus of FIG. 3 is that, as applied to an internet appliance 350, only the M−1 delay buffers 230 and the M downsampling operators would be resident in the internet appliance 350, and these are extremely simple functions that could be readily implemented in an embedded system. The only complex function, namely the filter coefficient multipliers 235, are implemented outside of the internet appliance at the other end of the communication channel in a computer 360. Since the video data stream travels only one way (from the internet appliance to a remote computer), there are no other video processing requirements for the internet appliance other than the downsampling and delay functions.

Figure 4:
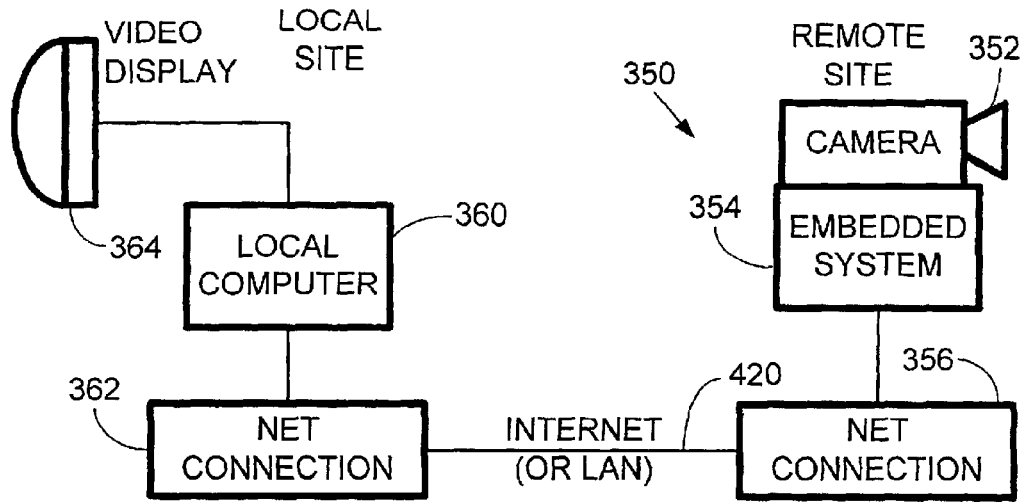
FIG. 4 illustrates one application of the invention to an internet appliance that implements a remote closed circuit television system via the internet or via a local network.

FIG. 4 illustrates a video communication system having the internet appliance 350 at one end of a communication channel 420 (such as a local network or the internet) and the computer 360 at the other end. In the example of FIG. 4, the internet appliance 350 consists of a video camera 352, an embedded system 354 and a physical network connection 356. The local computer 360 is connected via a local physical network connection 362 to a local port of the communication channel 420. The local computer 360 is also connected to a video monitor 364 which displays images transmitted from the camera 352 via the communication channel 420.

Figure 5:
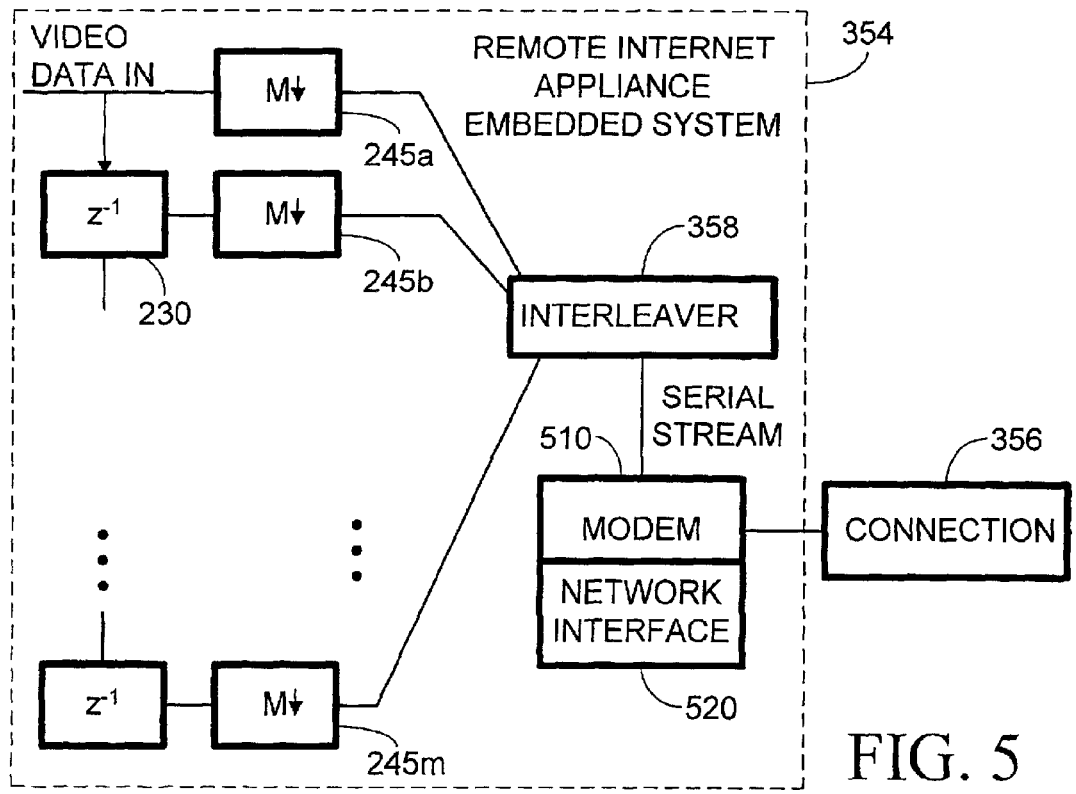
FIG. 5 illustrates the structure of an internet appliance in accordance with one embodiment of the present invention.

FIG. 5 illustrates the internal structure of the signal processing apparatus inside the embedded system 354. It includes the M−1 delay buffers 230 and the M downsampling operators 245a–245m of FIG. 3. The embedded system 354 of FIG. 5 further includes a conventional data interleaver 358 which forms a serial data stream from the parallel outputs of the M downsampling operators 245a–245m. The serial data stream is applied to the input of a modem 510 under control of embedded communication program 520. The output of the modem 510 is connected to the physical network connection 356.

Figure 6:
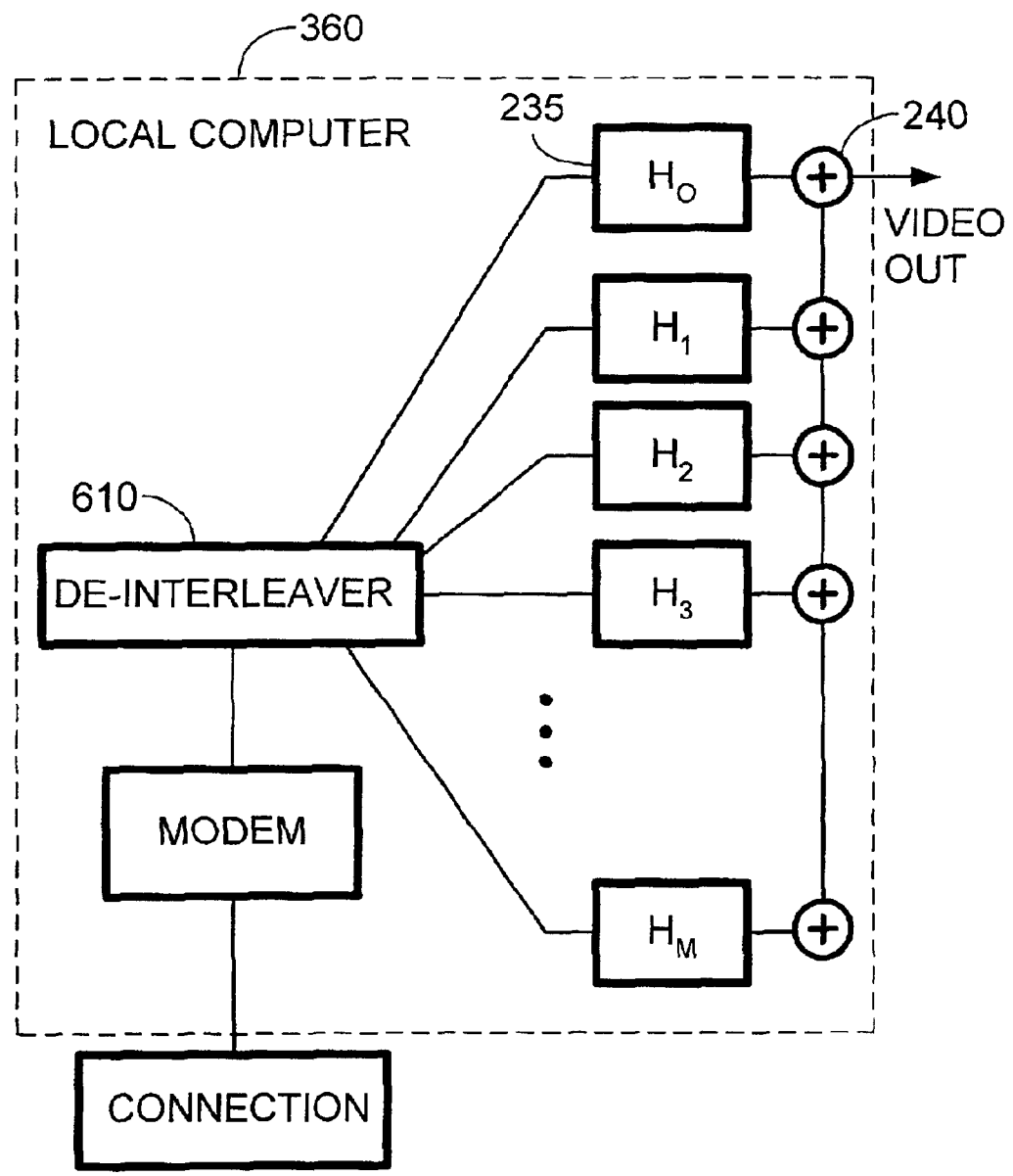
FIG. 6 illustrates the functional architecture of a host computer suitable for being linked to the internet appliance of FIG. 5.

FIG. 6 illustrates the communication architecture implemented in the local computer 360 of FIG. 4 for communication with the internet appliance of FIG. 4. It includes a de-interleaver 610 which converts the serial data stream received from the communication channel 420 into M parallel data streams. M filter coefficient multipliers 235, identical to the M filter coefficients of FIG. 3, receive corresponding ones of the M parallel data streams from the de-interleaver 610. The outputs of the M filter coefficient multipliers 610 are combined in M corresponding adders 240, identical to the M adders 240 of FIG. 3. The resulting sum is the processed video output signal.

Figure 7:
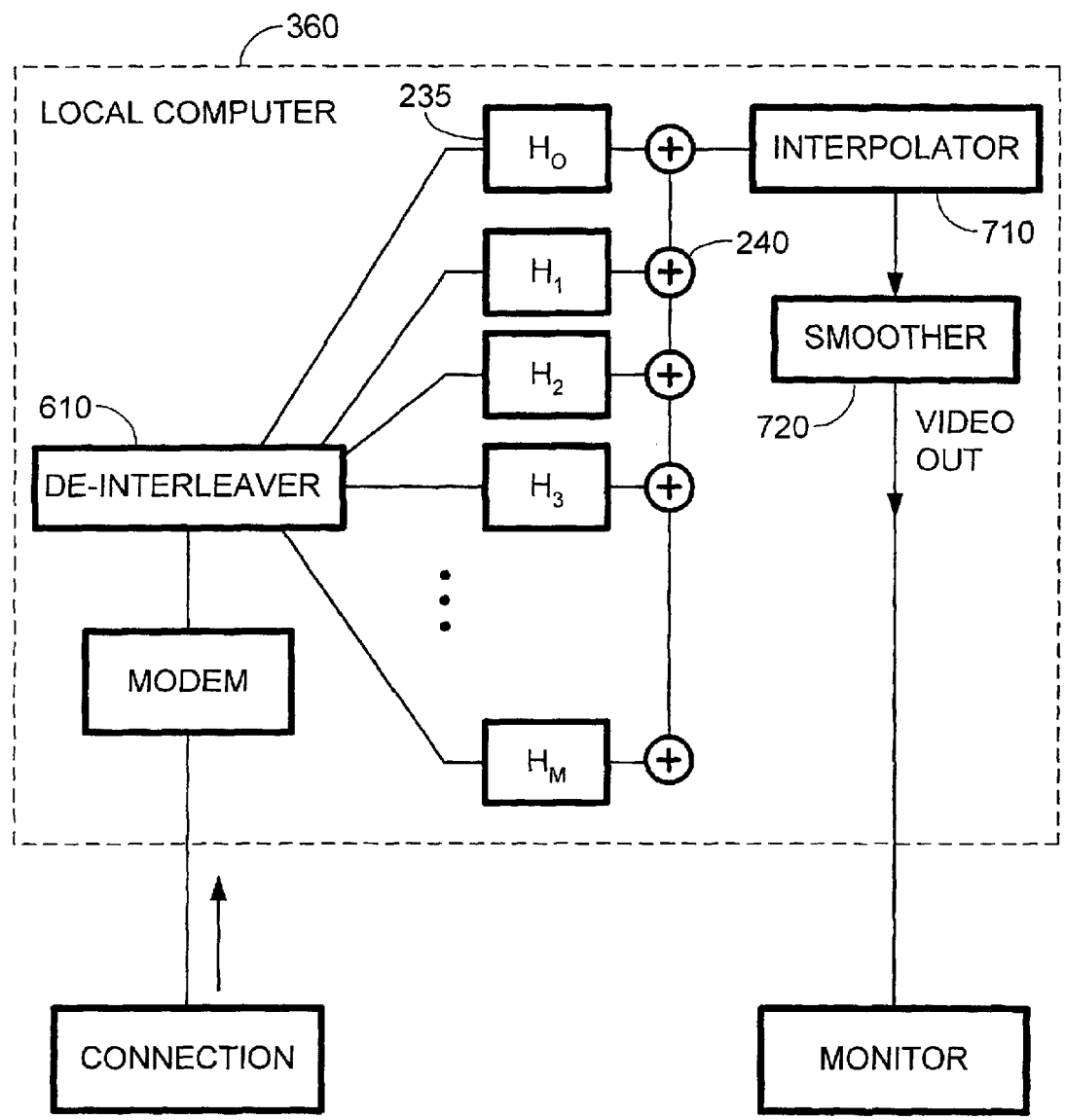
FIG. 7 illustrates an alternative architecture to that of FIG. 6.

FIG. 7 illustrates another embodiment of the communication architecture of the local computer 360. In the embodiment of FIG. 7, the video output signal is improved by an interpolator 710 that fills in the samples removed from the transmitted data signal by the downsampling operators 245. The interpolator employs conventional interpolation techniques. In addition, the output of the interpolator 710 is improved by a conventional smoothing filter 720.

While the invention has been described in detail by specific reference to preferred embodiments, it is understood that variations and modifications thereof may be made without departing from the true spirit and scope of the invention.

What is claimed is:

1. A communication system having a communication channel with at least two ends, one end of said channel being connected to a transmission device with relatively limited computational capacity and an other end of said channel being connected to a computer having relatively large computational capacity, wherein:

said transmission device comprising:
 (a) a signal source node;
 (b) a set of M−1 delay buffers connected in series and defining a set of M progressively delayed signal nodes, M being a positive integer, one end of said series of M delay buffers being connected to said signal source node;
 (c) a set of M parallel downsampling operators connected to said M progressively delayed signal nodes;
 (d) a parallel-to-serial converter having M parallel inputs and a single serial output, said M parallel inputs being connected to the outputs of said M parallel downsampling operators and said single serial output being coupled to the one end of said communication channel;

said computer having communication architecture comprising:
 (a) a serial-to-parallel converter having a single serial input and M parallel outputs, said single serial input being coupled to the other end of said communication channel;
 (b) a set of M parallel filter coefficient multipliers having respective inputs and outputs and corresponding to the respective coefficients $H_i(z^{-1})$ of an anti-aliasing filter $H(z)=\Sigma_{i=0}^{M-1} z^{-i} H_i(z^{-M})$, the inputs of said multipliers being connected to respective ones of the M parallel outputs of said serial-to-parallel converter;
 (c) a set of M−1 adders connected in series to define a set of M inputs and a single output, the outputs of said M multipliers being connected to respective ones of said set of M inputs defined by the series of adders, said single output of the series of adders being a received signal output.

2. The system of claim 1 wherein said transmission device comprises an internet appliance implemented as an embedded system and a video camera connected thereto, wherein said signal is a video signal.

3. The system of claim 1 wherein said downsampler removes one sample out of every sequence of j samples, wherein j is an integer.

4. The system of claim 3 wherein said communication architecture further comprises:
 an interpolator connected to said single output of said series of adders for interpolating a sample corresponding to each sample removed by said downsampler.

5. The system of claim 4 further comprising a smoothing filter connected to the output of said interpolator.

6. The system of claim 2 wherein said communication channel comprises an internet link.

7. The system of claim 2 wherein said communication channel comprises a local area network link.

8. An internet appliance for communicating over a communication channel with a computer, said internet appliance having relatively limited computational capacity, the computer having relatively large computational capacity, said internet appliance comprising:
 (a) a signal source node;
 (b) a set of M−1 delay buffers connected in series and defining a set of M progressively delayed signal nodes, M being a positive integer, one end of said series of M delay buffers being connected to said signal source node;
 (c) a set of M parallel downsampling operators connected to said M progressively delayed signal nodes;
 (d) a parallel-to-serial converter having M parallel inputs and a single serial output, said M parallel inputs being connected to the outputs of said M parallel downsampling operators and said single serial output being coupled to the one end of said communication channel.

9. The internet appliance of claim 8 wherein internet appliance is adapted to communicate over said communication channel with a computer having communication architecture comprising:
 (a) a serial-to-parallel converter having a single serial input and M parallel outputs, said single serial input being coupled to the other end of said communication channel;
 (b) a set of M parallel filter coefficient multipliers having respective inputs and outputs and corresponding to the respective coefficients $H_i(z^{-1})$ of an anti-aliasing filter $H(z)=\Sigma_{i=0}^{M-1} z^{-i} H_i(z^{-M})$, the inputs of said multipliers being connected to respective ones of the M parallel outputs of said serial-to-parallel converter;
 (c) a set of M−1 adders connected in series to define a set of M inputs and a single output, the outputs of said M multipliers being connected to respective ones of said set of M inputs defined by the series of adders, said single output of the series of adders being a received signal output.

10. The internet appliance of claim 8 wherein said internet appliance is implemented as an embedded system and a video camera is connected thereto, wherein said signal is a video signal.

11. The internet appliance of claim 8 wherein said downsampler removes one sample out of every sequence of j samples, wherein j is an integer.

12. The internet appliance of claim 9 wherein said communication architecture further comprises:
 an interpolator connected to said single output of said series of adders for interpolating a sample corresponding to each sample removed by said downsampler.

13. The internet appliance of claim 12 further comprising a smoothing filter connected to the output of said interpolator.

14. The internet appliance of claim 8 wherein said communication channel comprises an internet link.

15. The internet appliance of claim 8 wherein said communication channel comprises a local area network link.

16. A communication architecture implemented in a computer and adapted to communicate over a communication channel with a transmission device with relatively limited computational capacity and including a signal source node, a set of M−1 delay buffers connected in series and defining a set of M progressively delayed signal nodes, M being a positive integer, one end of said series of M delay buffers being connected to said signal source node, a set of M parallel downsampling operators connected to said M progressively delayed signal nodes and a parallel-to-serial converter having M parallel inputs and a single serial output, said M parallel inputs being connected to the outputs of said M parallel downsampling operators and said single serial output being coupled to the one end of said communication channel, said communication architecture comprising:

(a) a serial-to-parallel converter having a single serial input and M parallel outputs, said single serial input being coupled to the other end of said communication channel;

(b) a set of M parallel filter coefficient multipliers having respective inputs and outputs and corresponding to the respective coefficients $H_i(z^{-1})$ of an anti-aliasing filter $H(z)=\Sigma_{i=0}^{M-1} z^{-i} H_i(z^{-M})$, the inputs of said multipliers being connected to respective ones of the M parallel outputs of said serial-to-parallel converter;

(c) a set of M−1 adders connected in series to define a set of M inputs and a single output, the outputs of said M multipliers being connected to respective ones of said set of M inputs defined by the series of adders, said single output of the series of adders being a received signal output.

17. The architecture of claim 16 wherein said transmission device comprises an internet appliance implemented as an embedded system and a video camera connected thereto, wherein said signal is a video signal.

18. The architecture of claim 16 wherein said downsampler removes one sample out of every sequence of j samples, wherein j is an integer.

19. The architecture of claim 18 further comprising:

an interpolator connected to said single output of said series of adders for interpolating a sample corresponding to each sample removed by said downsampler.

20. The architecture of claim 19 further comprising a smoothing filter connected to the output of said interpolator.

21. The architecture of claim 17 wherein said communication channel comprises an internet link.

22. The architecture of claim 17 wherein said communication channel comprises a local area network link.

* * * * *